Patented July 19, 1949

2,476,669

UNITED STATES PATENT OFFICE 2,476,669

PRODUCTION OF THIAZOLES AND SELENAZOLES WITH FUSED-ON RINGS

Edward B. Knott, Wealdstone, England, assignor to Eastman Kodak Company, Rochester, N. Y., a corporation of New Jersey No Drawing. Application March 24, 1945, Serial No. 584,736. In Great Britain May 18, 1944

9 Claims. (Cl. 260—298)

1

This invention relates to the production of thiazoles and selenazoles with fused-on rings and more particularly to the production of derivatives of benzthiazole and benzselenazole having a further ring or rings fused on to the benzene ring.

According to the present invention, a thiazole or selenazole derivative is obtained by heating, in the presence of a water-binding agent, a 4-cyclylthiazole-5-alkyl-α-carboxylic acid or a 4-cyclylselenazole-5-alkyl-α-carboxylic acid. The term "cyclyl" is used to indicate a cyclic radical which can be aromatic or heterocyclic. The manufacture of such thiazole- and selenazole-carboxylic acids is described in my copending application, Serial No. 584,735, filed of even date herewith (now U. S. Patent 2,423,709, dated July 8, 1947).

The reaction may be formulated as follows:

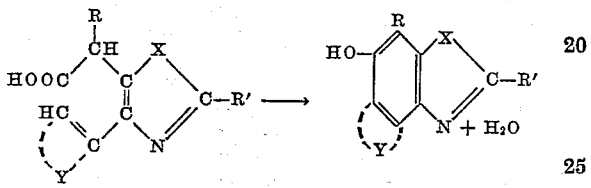

where R is a hydrogen atom or an alkyl, aryl or aralkyl radical, substituted or not, or an unsaturated organic radical, R' is a hydrogen atom or an alkyl, thiol, alkylthio, aralkylthio or amino group, X is sulfur or (in the case where R' is alkyl or amino) selenium and Y represents the atoms necessary to form a cyclic nucleus, homocyclic or heterocyclic.

The water-binding agent preferably employed is an aliphatic carboxylic anhydride and an alkali metal salt of an aliphatic acid, such as acetic anhydride and sodium acetate. Other aliphatic carboxylic anhydrides and alkali metal salts of carboxylic acids can be employed. In such case the acyl derivatives of benzthiazole or benzselenazole compound is obtained, e. g.

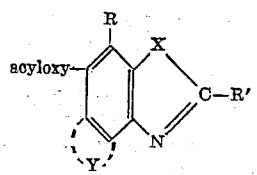

where R, R' and Y have the same meanings as before, except that when a 2-amino-4-cyclylthiazole- (or 4-cyclylselenazole) -5-alkyl-α-carboxylic acid is employed, the amino group is likewise acylated and R' would be an acylamino group.

2

In the naming of the compounds mentioned herein, the simple thiazole nucleus is numbered with plain numerals and the fused-on structure is numbered with dashed numerals in accordance with the compound from which it is derived, e. g.

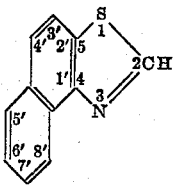

Naphtha-1':2':4:5-thiazole

Thionaphtheno-7':6':4:5-thiazole

Phenanthra-4':3':4:5-thiazole

Phenanthra-1':2':4:5-thiazole

The heating of the 4-cyclylthiazole-(or 4-cyclylselenazole)-5-alkyl-α-carboxylic acid in presence of a water-binding agent leads, as will be apparent from the formula hereinbefore given, to cyclization by union of an o-carbon atom of the cyclic substituent in the 4-position with the carbonyl carbon atom of the alkyl-α-carboxylic acid group in the 5-position. There remains attached to the latter carbon atom a hydroxyl group, acylated or not. This hydroxyl group, after deacylation if necessary, may be alkylated or acylated (e. g. benzoylated) if desired; or the compound containing such free hydroxyl group can be coupled with a diazotized amine. In these and other ways derivatives of the cyclized products can be obtained. Quaternary salts of the azole bases may be formed by heating the bases with alkyl salts. Inasmuch as water splits out during the cyclization, the cyclyl radical in the 4-position of the thiazole or selenazole carboxylic acid must contain a hydrogen atom on at least one of the carbon atoms adjacent to the carbon atom which is attached to the thiazole or selenazole nucleus. For convenience of expression, this carbon atom containing the necessary hydrogen atom is referred to herein as an o-carbon atom.

The preferred water-binding agent is an aliphatic acid anhydride and in this case the cyclization can be conveniently accomplished by gently refluxing the reagents. In the case of 4-phenylthiazole-5-carboxylic acids, 2 to 3 hours was required. In the case of 4-naphthylthiazole-5-carboxylic acids, cyclization took only 3 to 4 minutes. In the case of the 5-propionic acids and the 4-thienyl compounds, the time required was from 10 to 30 minutes.

The general procedure for ring closure of the 2-methyl compounds is as follows:

10 grams of the acid, 2.5 grams of anhydrous sodium acetate and 40 cc. of acetic anhydride are refluxed gently under an air condenser for the required time. 5 cc. of glacial acetic acid are then added and the hot liquor poured into 500 cc. of cold water. The addition of the acetic acid allows the immediate destruction of the anhydride on contact with the water and prevents the occlusion of acetic anhydride in the grains. In some cases the required substance is obtained immediately as a solid; in others the oil which is formed at first, solidifies on standing. It is collected, washed with water, any lumps are broken up and the whole well washed with methanol. The substance is then recrystallized from methanol or spirit.

Examples of the procedure are the following:

*Example 1.—4'-acetoxy-2-methylnaphtha-1':2':4:5-thiazole*

2.33 grams 2-methyl-4-phenylthiazole-5-acetic acid, 1 gram anhydrous sodium acetate and 9 cc. acetic anhydride were refluxed gently for 4 hours under an air condenser. The excess anhydride was decomposed as described in the general procedure and the crystalline residue collected and washed with a little ether to remove traces of oil. Recrystallized from methanol, the product formed long creamy needles, M. P. 140° to 141° C.

*Example 2.—1'-acetoxy-2-methylphenanthra-4':3':4:5-thiazole*

4-(1'-naphthyl)-2-methylthiazole-5-acetic acid (25 grams) anhydrous sodium acetate (5 grams) and acetic anhydride (100 cc.) were refluxed for 30 minutes, chilled to set, acetic acid (20 cc.) added and water to precipitate brown crystalline flocks. Recrystallized from spirit-charcoal they formed glistening flat needles M. P. 167° to 169° C.

*Example 3.—4'-acetoxy-2-methylphenanthra-1':2':4:5-thiazole*

4-(2'-naphthyl)-2-methylthiazole-5-acetic acid (65.0 grams) anhydrous sodium acetate (13.0 grams) and acetic anhydride (260 cc.) were refluxed gently for 30 minutes. The solution turned a deep red. It was chilled until it gelled, acetic acid (50 cc.) was added and the mixture poured into water (1 liter). A flocculent pink precipitate was formed which was collected after one hour. It was washed with water then methanol to remove most of the coloring matter. Recrystallized from spirit-charcoal, it formed colorless silky needles M. P. 159.5° C.

*Example 4.—4'-acetoxy-2-methylthionaphtheno-7':6':4:5-thiazole*

4-(2'-thienyl)-2-methylthiazole-5-acetic acid (0.3 gram) anhydrous sodium acetate (0.1 gram) and acetic anhydride (1.5 cc.) were refluxed for 30 minutes, chilled and scratched. The required substance crystallized. Acetic acid (1 cc.) was added followed by water (25 cc). The pink flocks, recrystallized from ligroin formed pink feathery needles M. P. 130° to 130.5° C.

*Example 5.—4'-acetoxy-2:3'-dimethylnaphtha-1':2':4:5-thiazole*

α-5(4-phenyl-2-methylthiazole)propionic acid (2.47 grams) acetic anhydride (10 cc.) and anhydrous sodium acetate (0.5 gram) were refluxed for 30 minutes, diluted with acetic acid (2 cc.) and poured into water. Buff colored flocks were formed. They were collected, washed with water and recrystallized from spirit as colorless needle rosettes M. P. 171° to 172° C.

By the foregoing procedure, the following compounds can be prepared:

1. 4'-acetoxy-2-methylnaphtha-1':2':4:5-thiazole M. P. 140° C. and its derivatives, e. g.

(a) 4'-hydroxy-2-methylnaphtha-1':2':4:5-thiazole obtained by adding excess of twice normal sodium hydroxide to a spirit solution of the above acetoxy and then acidifying with acetic acid. Commences to sublime and darken at 252° C.

(b) 4'-methoxy-2-methylnaphtha-1':2':4:5-thiazole, obtained by shaking the above-obtained solution of hydroxy compound with dimethyl sulfate at 50° C. On recrystallization from methanol, it formed yellow prisms M. P. 100° C.

(c) 4'-methoxy-2-methylnaphtha-1':2':4:5-thiazole metho-p-toluene sulfonate, obtained by fusing equimolecular proportions of the base and methyl-p-toluenesulfonate at 140° C. for 2 hours.

(d) 4'-methoxy-2-methylnaphtha-1':2':4:5-thiazole methiodide obtained by adding an aqueous solution of the metho-p-toluenesulfonate to a 10 per cent aqueous solution of potassium iodide as colorless flocks. On recrystallization from methanol, colorless gleaming needles M. P. 217° to 219° C.

(e) 4'-ethoxy-2-methylnaphtha-1':2':4:5-thiazole. Obtained like the methoxy derivative but using diethyl sulfate, M. P. 147° to 148° C.

(f) 4'-methoxy-2-acetylmethin-3-methylnaphtha-1':2':4:5-(2:3 dihydro) thiazole, obtained as yellow flocks by the addition of slightly more than one molecular proportion of acetyl chloride to 4'-methoxy-2-methylnaphtha-1':2':4:5-thiazole metho-p-toluene sulphonate given above in pyridine at 0° C. followed by 2 hours at 100° C. The flocks were recrystallized from benzene to give golden needles of M. P. 150° C.

(g) 4'-benzoyloxy-2-methylnaphtha-1':2':4:5-thiazole. Obtained by shaking a caustic soda solution of the 4'-hydroxy compound with benzoyl chloride M. P. 169° C.

In items 2 to 12 which follow, the 4'-hydroxy, the 4'-methoxy, the 4'-ethoxy and the 4'-benzoyloxy derivatives were obtained as described under item 1.

2. 4'-acetoxy-2:6'-dimethylnaphtha-1':2':4:5-thiazole obtained from 4-(4'-methylphenyl)-2-methylthiazole-5-acetic acid, M. P. 162° C., and its derivatives, e. g.

(a) 4'-hydroxy-2:6'- dimethylnaphtha-1':2':-4:5-thiazole. Dec. 260° C.
(b) 4'-methoxy derivative M. P. 103° to 104° C.
(c) 4'-ethoxy derivative M. P. 121° to 122° C.
(d) 4'-benzoyloxy derivative M. P. 162° to 163° C.

3. 4'-acetoxy - 2 - methyl - 6' - ethylnaphtha-1':2':4:5-thiazole obtained from 4-(4'-ethylphenyl)-2-methylthiazole-5-acetic acid, M. P. 122.5° C., and its derivatives, e. g.

(a) 4'-hydroxy-2-methyl - 6' - ethylnaphtha-1':2':4:5-thiazole. Dec. 248° C.
(b) 4'-methoxy derivative M. P. 65° C.
(c) 4'-ethoxy derivative M. P. 87° to 88° C.

4. 4'-acetoxy-2-methyl-6' - isopropylnaphtha-1':2':4:5-thiazole, obtained from 4-(4'-isopropylphenyl)-2-methylthiazole-5-acetic acid, M. P. 101° to 101.5° C., and its derivatives, e. g.

(a) 4'-hydroxy-2-methyl-6' - isopropylnaph - tha-1':2':4:5-thiazole, M. P. 231° C.
(b) 4'-methoxy derivative M. P. 63° to 64° C.
(c) 4'-ethoxy derivative M. P. 91° C.

5. 4' - acetoxy - 2:6':8' - trimethylnaphtha - 1':2':4:5-thiazole obtained from 4-(2':4'-dimethylphenyl)thiazole-5-acetic acid, M. P. 181° C., and its derivatives, e. g.

(a) 4' - hydroxy - 2:6':8' - trimethylnaphtha-1':2':4:5-thiazole, M. P. 198° C. (Dec. starts 183° C.).
(b) 4'-methoxy derivative M. P. 91° to 92° C.
(c) 4'-ethoxy derivative M. P. 131° C.

6. 4'-acetoxy-6'-methoxy-2 - methylnaphtha-1':2':4:5-thiazole, obtained from 4-(4'-methoxyphenyl)-2-methylthiazole-5-acetic acid, M. P. 161° to 162° C. and its derivatives, e. g., (a) 4'-hydroxy-6'-methoxy - 2 - methylnaphtha-1':2':4:5-thiazole Dec. starts 257° C.
(b) 4':6' - dimethoxy - 2 - methylnaphtha-1':2':4:5-thiazole, M. P. 74° C.
(c) 6'-methoxy-4' - ethoxy - 2 - methylnaphtha-1':2':4:5-thiazole, M. P. 115° to 116° C.

7. 4'-acetoxy-6'-ethoxy - 2 - methylnaphtha-1':2':4:5-thiazole, obtained from 4-(4'-ethoxyphenyl)thiazole-5-acetic acid, M. P. 160° to 162° C., and its derivatives, e. g., (a) 4'-hydroxy-6'-ethoxy-2 - methylnaphtha-1':2':4:5-thiazole, Dec. 243° C.
(b) 4'-methoxy derivative, M. P. 120° to 121° C.
(c) 4'-ethoxy derivative M. P. 145° to 146° C.

8. 6'-chloro-4' - acetoxy - 2 - methylnaphtha-1':2':4:5-thiazole, obtained from 4-(4'-chlorophenyl)-2-methylthiazole-5-acetic acid, M. P. 209° to 210° C., and its derivatives, e. g., (a) 6'-chloro-4'-hydroxy-2 - methylnaphtha-1':2':4:5-thiazole, Dec. 280° C.
(b) 4'-methoxy derivative, M. P. 134° to 135° C.
(c) 4'-ethoxy derivative, M. P. 183.5° C.

9. 1'-acetoxy-2-methylphenanthra -4':3':4:5-thiazole, M. P. 167° to 169° C. and its derivatives, e. g.

(a) 1'-hydroxy derivative M. P. 250° C. (commences to sublime 220° C.)
(b) 1'-methoxy derivative, M. P. 136° to 137° C.
(c) 1'-ethoxy derivative M. P. 144° to 145° C.

10. 4' - acetoxy - 2 - methylphenanthra - 1':2':4:5-thiazole, M. P. 159.5° C., and its derivatives, e. g., (a) 4'-hydroxy derivative. Begins to sublime and decompose 278° to 280° C.
(b) 4'-methoxy derivative, M. P. 173° C.
(c) 4'-ethoxy derivative, M. P. 177.5° C.

11. 4' - acetoxy - 2 - methylthionaphtheno-7':6':4:5-thiazole M. P. 130° to 130.5° C., and its derivatives, e. g., (a) 4'-hydroxy derivative sublimes at 268° C.
(b) 4'-methoxy derivative M. P. 127.5° to 128° C.

12. 4' - acetoxy - 2:3' - dimethylnaphtha - 1':2':4:5-thiazole M. P. 171° to 172° C., and its derivatives, e. g., (a) 4'-hydroxy derivative, M. P. 300° C. (slight dec. and sub. at 250° C.).
(b) 4'-methoxy derivative, M. P. 91° to 92° C.
(c) 4'-ethoxy derivative, M. P. 100° to 101° C.

The general procedure for ring closure of the 2-amino compounds is as follows:

2 grams of the acid, 10 to 20 cc. of acetic anhydride and 0.5 gram of anhydrous sodium acetate are refluxed gently for the required time. In the case of the naphthathiazoles, the product precipitated out and was separated, washed and recrystallized. In the case of thionaphthenothiazoles and phenanthrathiazoles, the precipitation was assisted by addition of acetic acid and water.

Examples of the procedure are the following:

*Example 6.—2-acetamido-4'-acetoxynaphtha-1':2':4:5-thiazole*

2-amino-4-phenylthiazole-5-acetic acid (2.0 grams) acetic anhydride (10 cc.) and anhydrous sodium acetate (0.5 gram) were refluxed gently for 3 hours. After about 90 minutes, the required naphthathiazole commenced precipitating as yellow grains. On cooling, the mixture set to a mealy cake. It was collected, washed with water and spirit leaving yellow grains which fluoresced intensely blue in ultraviolet light.

*Example 7.—2-acetamido-1'-acetoxyphenanthra-4':3':4:5-thiazole*

2-amino-4-(1'-naphthyl)thiazole-5-acetic acid (1.0 gram) anhydrous sodium acetate (0.2 gram) and acetic anhydride (10 cc.) were refluxed gently for ¾ hour. After 30 minutes, clusters of needles commenced to form. Acetic acid (2 cc.) was added and the liquor poured into water (200 cc.). Yellow flocks of the desired substance were precipitated. They were collected, washed well with water and spirit. The latter solvent removed a yellow substance which when thrown down by the addition of water to the filtrate, fluoresced yellow in ultraviolet light. The required substances fluoresced blue in ultraviolet light.

It was recrystallized from spirit in which it was more soluble than the corresponding naphthathiazole. It formed glistening needles M. P. 279° C. of the monohydrate.

*Example 8.—2-acetamido-4'-acetoxyphenanthra-1':2':4:5-thiazole*

2-amino-4-(2'-naphthyl)thiazole-5-acetic acid (2.0 grams) anhydrous sodium acetate (0.5 gram) and acetic anhydride (8.0 cc.) were refluxed for a few minutes until the yellow liquid had solidified. Acetic acid (2 cc.) was added and the cake broken up. Water (50 cc.) was then added and the grains collected and washed with spirit.

Recrystallized from acetic anhydride, the substance formed colorless ill-defined crystals M. P. 290° C.

*Example 9.—2-acetamido - 4' - acetoxythionaphtheno-7':6':4:5-thiazole*

2-amino-(2'-thienyl)thiazole-5-acetic acid (0.1 gram) anhydrous sodium acetate (0.05 gram) and acetic anhydride (2 cc.) were refluxed for 30 minutes. On adding a few drops of acetic acid followed by water (10 cc.) pink flocks were formed which were recrystallized from alcohol. The substance then formed glistening flat, cream needles M. P. 285° to 289° C.

*Example 10.—2-acetamido-4'acetoxy-3'-methylnaphtha-1':2':4:5-thiazole*

α-5-(2-amino-4-phenylthiazole)propionic acid (.24 gram) acetic anhydride (6 cc.) and anhydrous sodium acetate (0.3 gram) were refluxed for 10 minutes. After 5 minutes, the solution became filled with a mass of glistening creamy plates. They were collected when cold, washed with water and spirit and recrystallized from acetic anhydride or acetic acid forming asbestos like needles, M. P. 300° C.

2 - acetamido - 4' - acetoxy-6'-methylnaphtha-1':2':4:5-thiazole was similarly obtained as cream plates melting at 286° C. from 2-amino-4-(4'-methylphenyl)-thiazole-5-acetic acid.

*Example 11.—2 - acetamido-4'-acetoxynaphtha-1':2':4:5-selenazole*

2.81 grams of 2-amino-4-phenylselenazole-5-acetic acid, 1.0 gram sodium acetate and 10 cc. acetic anhydride were boiled gently for 4 hours. After 1½ hours, the required substance commenced to precipitate. The excess anhydride was destroyed with water and the solid collected and washed well with methanol. The yellow grains were recrystallized from spirit and formed glistening yellow plates M. P. 290° C. (dec. commencing at 260° C.).

From the products of these examples, derivatives can be prepared of which the following are illustrative:

From 2 - acetamido - 4' - acetoxynaphtha-1':2':4:5-thiazole, M. P. 286° C. (Example 6.)

(a) 2 - acetamido - 4' - hydroxynaphtha-1':2':4:5-thiazole dihydrochloride by adding an excess of twice normal sodium solution of the acetoxy compound, diluting with water and adding an equal volume of concentrated hydrochloric acid. The colorless needles precipitated were dissolved in spirit, and reprecipitated with hydrochloric acid to purify them.

(b) 2-methylacetamido-4'-methoxynaphtha-1':2':4:5-thiazole. The product just described was dissolved in spirit and an excess of 2N-sodium hydroxide added, an equal volume of water was added and the clear solution heated to 40° C. Methyl sulfate was added in 2 cc. portions and shaken until precipitation was complete. The yellow solid on recrystallization from methanol formed long colorless needles M. P. 118° to 120° C.

(c) 2 - methylamido - 4' - methoxynaphtha-1':2':4:5-thiazole.

This was obtained on concentrating the mother liquor from the above methylation. From methanol it formed cream needles rosettes M. P. 191.5° to 192.5° C. soluble in dilute acids.

The general procedure for ring closure of the 2-alkylthio compounds is as follows:

2-alkylthio-4-arylthiazole - 5 - acetic acid (2 grams) anhydrous sodium acetate (0.5 gram) and acetic anhydride (10 cc.) were refluxed gently for 2 hours. The light brown solution was diluted with acetic acid and poured into water. The red oil thrown down slowly solidified. It was dissolved in hot spirit and allowed to cool. An oil separated which was filtered off. On further standing tiny yellow rosettes separated.

Recrystallization from spirit in all cases gave the pure solids which fluoresced intensely blue in ultraviolet light.

By this procedure, the following compounds can be prepared:

1. 4'-acetoxy-2-methylthionaphtha-1':2':4:5-thiazole, M. P. 143° C. and its derivatives, e. g., (a) 4'-hydroxy derivative separated as a colorless flock on acidification of the aqueous alcoholic sodium hydroxide solution of the above 4'-acetoxy compound M. P. 255° C. (some dec. 210° C.).

(b) 4'-methoxy derivative by methylation of above 4'-hydroxy derivative with alkali and dimethyl sulfate M. P. 110° to 111° C.

2. 4'-acetoxy - 2 - ethylthionaphtha-1':2':4:5-thiazole. M. P. 101° to 102° C., and its derivatives, e. g.

(a) 4'-hydroxy derivative M. P. 206° C. (same dec. 194° C.). Obtained as described under 1(a) above.

3. 4'-acetoxy-2-methylthio-6'-methylnaphtha-1':2':4:5-thiazole M. P. 155° to 156° C., and its derivatives, e. g., (a) 4'-hydroxy derivative sublimes at about 213° C. Obtained as described under 1(a) above.

(b) 4'-methoxy derivative M. P. 109° to 110° C. Obtained as described under 1(b) above.

Further examples of alkylthio compounds are given below:

*Example 12.—2 - methylthio-1'-acetoxyphenanthra-4':3':4:5-thiazole*

2 - methylthio - 4 - (1' - naphthyl)thiazole-5-acetic acid (0.2 gram) anhydrous sodium acetate (0.05 gram) and acetic anhydride (2 cc.) were refluxed for 30 minutes. The solution was chilled and decomposed with acetic acid and water giving a brown oil which partially solidified on standing. It was collected, washed and digested with spirit-charcoal giving an orange solution on filtration. On allowing to cool, the solution deposited an oil. The liquor was decanted and concentrated. An orange solid then separated which was recrystallized from spirit giving glistening flat yellow needles M. P. 128° to 129° C.

By hydrolyzing the product of this example in alcoholic sodium hydroxide solution and acidifying the solution, the 1'-hydroxy derivative was obtained in colorless flocks. Recrystallized from methanol, they formed dull yellow needles M. P. 162° to 164° C.

*Example 13.—4'-acetoxy - 2 - methylthiophenanthra-1':2':4:5-thiazole*

2-methylthio-4-(2'-naphthyl)thiazole-5- acetic acid (0.3 gram) anhydrous sodium acetate (0.06 gram) and acetic anhydride (2 cc.) were refluxed for 30 minutes. The solution was chilled to gel the acetate, acetic acid (1 cc.) was added whereupon the required substance crystallized. Water was added to dissolve the acetate. The substance was collected and washed with water and cold spirit. Recrystallized from spirit-charcoal, it formed colorless glossy hairs M. P. 152° C, fluorescing intensely blue in ultraviolet light.

By hydrolyzing the product of this example in alcoholic sodium hydroxide solution and acidifying this solution, the 1'-hydroxy derivative was obtained in yellow grains which, on recrystallization from spirit, formed tiny glistening yellow needles which commenced subliming at 240° C. and decomposed at 293° C.

The mother liquors from Example 1 contained a by-product which crystallized out on standing for several days. It proved to be: 4'-acetoxy-3'-acetyl-2-methylnaphtha-1':2':4:5-thiazole. On recrystallization from methanol, it formed gleaming colorless needles, M. P. 205° C.

The 4'-hydroxy derivative M. P. 126° to 127° C. was formed from it by hydrolysis with aqueous caustic soda. Methylation of this proceeded less smoothly than with the analogue unsubstituted in the 3'-position but gave the 4'-methoxy derivative M. P. 113° to 114° C.

A similar by-product, 4'-acetoxy-3'-acetyl-2:6'-dimethylnaphtha-1':2':4:5-thiazole was obtained in the cyclization of 4-(4'-methylphenyl)-2-methylthiazole-5-acetic acid. Cream needles M. P. 215° C.

By the use of 2-benzylthio-4-arylthiazole-5-acetic acids instead of the corresponding 2-alkylthio compounds, the analogous 2-benzylthio derivatives are obtained.

What I claim as my invention and desire to be secured by Letters Patent of the United States is:

1. An azole compound selected from those having the following general formula:

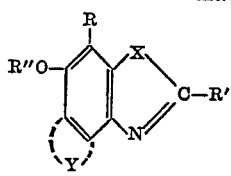

wherein R represents a member selected from the group, consisting of hydrogen, an alkyl radical, an aralkyl radical and an aryl radical, R' represents a member selected from the group consisting of hydrogen, an alkyl radical, a thiol radical, an alkylthio radical, an aralkylthio radical and an acylamino group, X represents a sulfur atom when R' represents a member selected from the group consisting of hydrogen, an alkyl radical, a thiol radical, an alkylthio radical, an aralkylthio radical and an acylamino group, and X represents a selenium atom when R' represents a member selected from the group consisting of an alkyl group and an acylamino group, R'' represents a member selected from the group consisting of hydrogen, an alkyl group and an acyl group, and Y represents the non-metallic atoms necessary to complete a cyclic nucleus selected from the group consisting of nuclei of the benzene series, nuclei of the naphthalene series and nuclei of the thiophene series.

2. A thiazole compound selected from those having the following general formula:

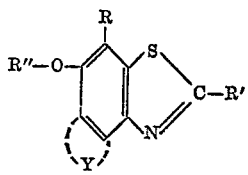

wherein R represents a member selected from the group consisting of hydrogen, an alkyl radical, an aralkyl radical and an aryl radical, R' represents a member selected from the group consisting of hydrogen, an alkyl radical, a thiol radical, an alkylthio radical, an aralkylthio radical and an acylamino group, R'' represents a member selected from the group consisting of hydrogen, an alkyl group and an acyl group, and Y represents the non-metallic atoms necessary to complete a cyclic nucleus selected from the group consisting of nuclei of the benzene series, nuclei of the naphthalene series and nuclei of the thiophene series.

3. A thiazole compound selected from those having the following formula:

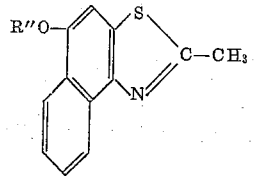

wherein R'' represents an alkyl group.

4. The thiazole compound of the following formula:

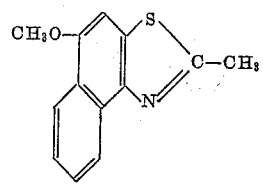

5. The thiazole compound of the following formula:

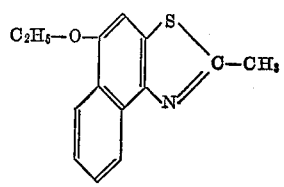

6. The thiazole compound of the following formula:

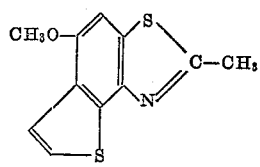

7. A thiazole compound selected from those having the following formula:

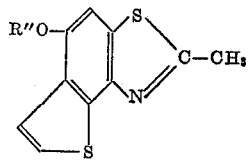

wherein R'' represents an alkyl group.

8. A process for preparing an azole compound comprising heating, in the presence of sodium acetate and acetic anhydride, a compound selected from those having the following general formula:

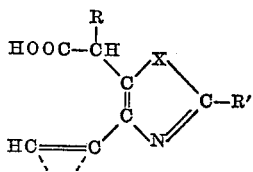

wherein R represents a member selected from the group consisting of hydrogen, an alkyl radical, an aralkyl radical, and an aryl radical, R' represents a member selected from the group consisting of hydrogen, an alkyl radical, a thiol radical, an alkylthio radical, an aralkylthio radical and an amino group, X represents sulfur when R' has the values recited above and X represents selenium when R' represents a member selected from the group consisting of an alkyl radical and an amino group, and Y represents the non-metallic atoms necessary to complete a cyclic nucleus selected from the group consisting of nuclei of the benzene series, nuclei of the naphthalene series and nuclei of the thiophene series.

9. A process for preparing a thiazole compound comprising heating, in the presence of sodium acetate and acetic anhydride, a compound selected from those having the following general formula:

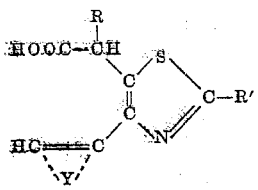

wherein R represents a member selected from the group consisting of hydrogen, an alkyl radical, an aralkyl radical, and an aryl radical, R' represents a member selected from the group consisting of hydrogen, an alkyl radical, a thiol radical, an alkylthio radical, an aralkylthio radical and an amino group, and Y represents the non-metallic atoms necessary to complete a cyclic nucleus selected from the group consisting of nuclei of the benzene series, nuclei of the naphthalene series and nuclei of the thiophene series.

EDWARD B. KNOTT.

REFERENCES CITED

The following references are of record in the file of this patent:

FOREIGN PATENTS

| Number | Country | Date |
|--------|---------|------|
| 402,458 | Great Britain | Dec. 4, 1933 |
| 411,479 | Great Britain | June 5, 1934 |